E. J. CLANTON.
FEEDERS FOR THRASHING-MACHINES.
No. 193,319. Patented July 24, 1877.
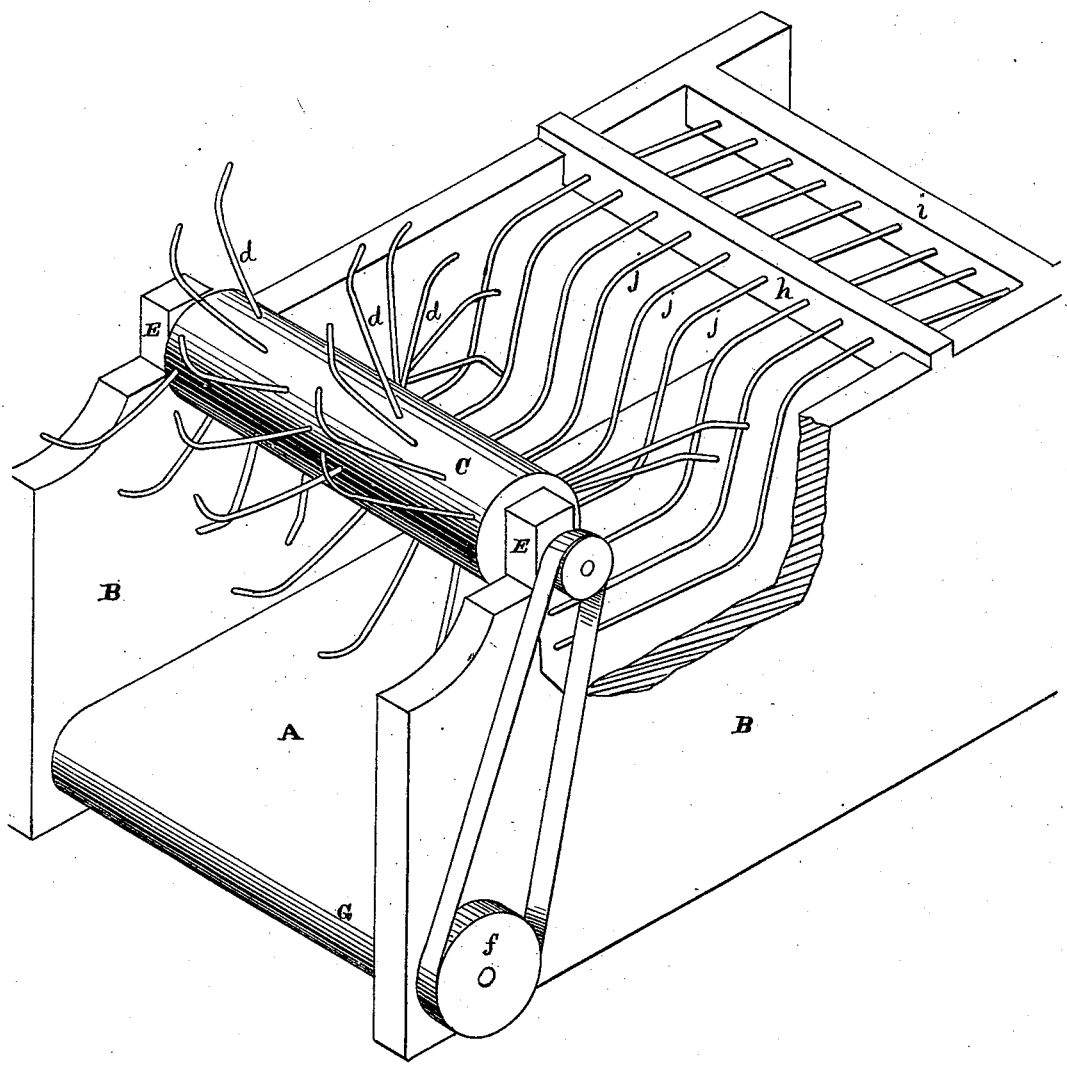
Witnesses
Geo. H. Strong
Dewyn J. Stacy
Inventor
Ethelbert J. Clanton
By Dewey & Co. Attys.

UNITED STATES PATENT OFFICE.

ETHELBERT J. CLANTON, OF WOODLAND, CALIFORNIA.

IMPROVEMENT IN FEEDERS FOR THRASHING-MACHINES.

Specification forming part of Letters Patent No. 193,319, dated July 24, 1877; application filed June 1, 1877.

*To all whom it may concern:*

Be it known that I, ETHELBERT J. CLANTON, of Woodland, county of Yolo, and State of California, have invented an Improved Feed Regulator for Thrashing-Machines; and I do hereby declare the following to be a full, clear, and exact description thereof, reference being had to the accompanying drawings.

My invention relates to certain improvements in endless-belt feeders for thrashing-machines; and it consists in the application of a straw-gage and retarding-drum, applied in such a manner that the grain is spread, and prevented from going into the machine in bunches.

Referring to the accompanying drawings, let A represent an endless-belt feeding attachment for thrashing-machines. B B are the sides of the attachment. Near the end of the attachment, which is next to the machine, I mount a roller, C, which is provided with long teeth $d$ $d$, the extreme ends of which are bent, as represented. This roller is mounted in adjustable bearings E E on the sides B B, so that it can be moved up or down, as desired, to regulate the space between its teeth and the belt A. I prefer to arrange the teeth in spiral rows around the roller, although they could be otherwise disposed, if preferred. This roller is driven by a belt-connection with a pulley, $f$, on the end of the roller or drum G, around which one end of the endless belt passes, and this roller is driven in the usual way by a belt-connection with the cylinder-shaft of the machine.

Across the outer ends of the sides B B I secure two cross-bars, $h$ $i$, at a short distance apart, and to these cross-bars I secure one end of a number of parallel bent wires, $j$ $j$ $j$. These wires project forward, and are bent down under the roller C, and curved forward, as represented, so that the ends of the curved teeth will sweep through between them when the roller C is rotated. The lower ends of these teeth form a gage and spreader, which allows only a certain thickness of grain to pass under them. The roller C is rotated so that the teeth sweep backward, entering between the points, and moving backward between them, with the backs of their curved ends pressing the grain toward the outer end of the feeder-belt, thus spreading and leveling the grain before it enters the throat of the machine.

Having thus described my invention, what I claim, and desire to secure by Letters Patent, is—

The endless belt A and upright sides B, in combination with the roller C, with its teeth $d$ $d$ bent as described, and the parallel series of wires $j$ $j$, curved downward under the roller C so as to form a gage and spreader for the grain, the parts being combined and operated substantially as above specified.

In witness whereof I have hereunto set my hand and seal.

ETHELBERT J. CLANTON. [L. S.]

Witnesses:
 JOHN F. FRIGGENS,
 RASMUS B. JOHNSON.